No. 788,930. PATENTED MAY 2, 1905.
P. MORGAN.
COMBINATION TRUCK AND SCALE PLATFORM.
APPLICATION FILED JULY 21, 1904.
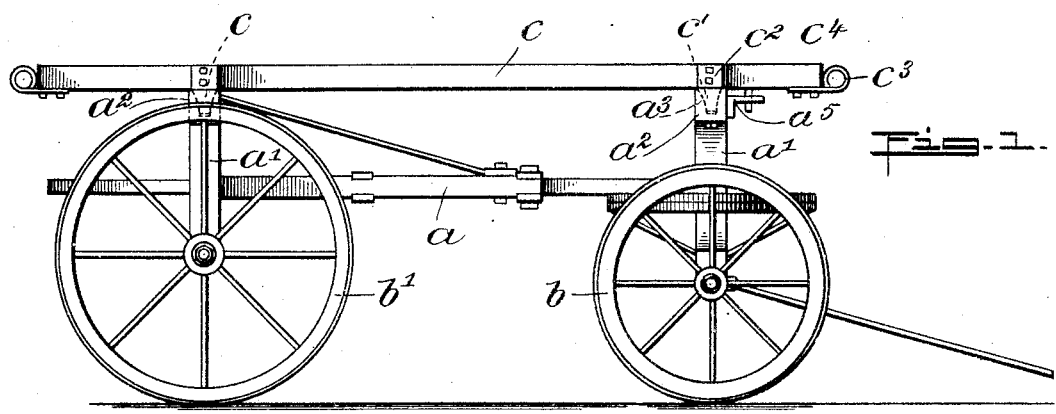
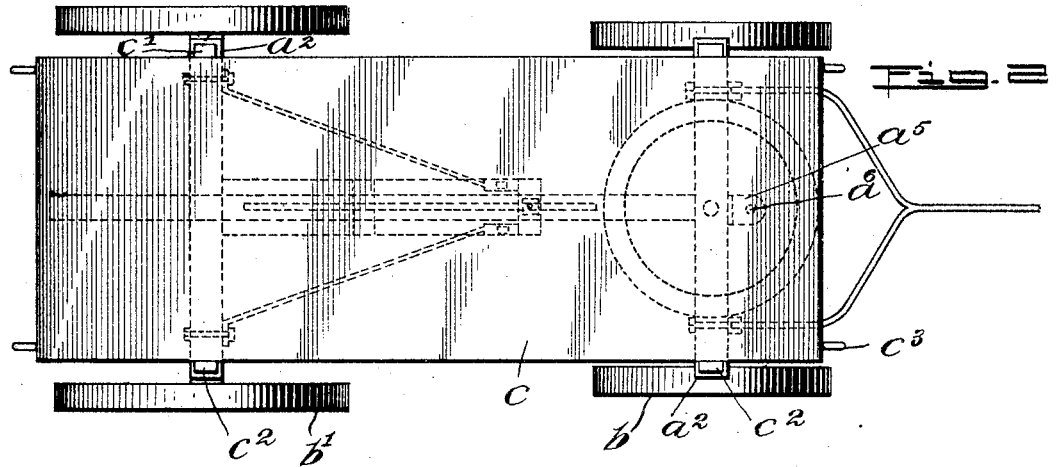
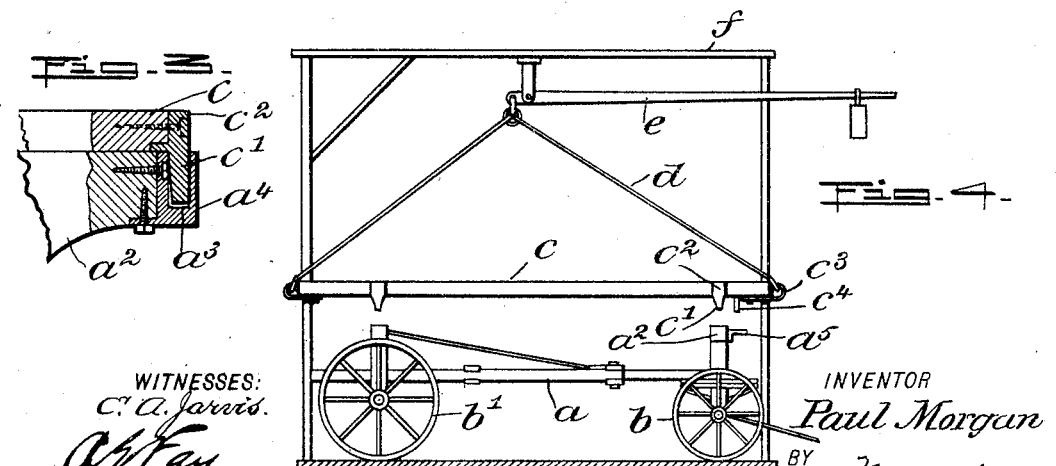
WITNESSES:
C. A. Jarvis.
A. V. Fay.
INVENTOR
Paul Morgan
BY
ATTORNEYS No. 788,930. Patented May 2, 1905.

UNITED STATES PATENT OFFICE.

PAUL MORGAN, OF NEW ORLEANS, LOUISIANA.

COMBINATION TRUCK AND SCALE-PLATFORM.

SPECIFICATION forming part of Letters Patent No. 788,930, dated May 2, 1905.

Application filed July 21, 1904. Serial No. 217,592.

*To all whom it may concern:*

Be it known that I, PAUL MORGAN, a citizen of the United States, and a resident of New Orleans, in the parish of Orleans and State of Louisiana, have invented a new and Improved Combination Truck and Scale-Platform, of which the following is a full, clear, and exact description.

My invention relates to a truck having a scale-platform detachably mounted thereon.

Under the present systems of transferring coffee-bags from the pile to the railway-cars the weighing and transferring are two separate operations, each of which costs about three cents per bag. To provide means for performing these two operations at once, thus making a great saving of cost and time required, is an important object of my invention. It is to be understood, however, that the invention which I have made to accomplish this result is capable of use in other connections. It may be used in weighing all kinds of material in sacks or other receptacles and also in bulk.

Reference is to be had to the accompanying drawings, forming a part of this specification, in which similar characters of reference indicate corresponding parts in all the figures.

Figure 1 is a side elevation of a preferred form of my invention. Fig. 2 is a plan view thereof. Fig. 3 is a sectional view of a portion of the device on a large scale; and Fig. 4 is a side elevation of the device, showing it in use in combination with the weighing-machine.

$a$ represents the frame of the truck having the front and rear wheels $b$ and $b'$, respectively, and provided with front and rear uprights $a'$ for the purpose of supporting a detachable platform $c$. The uprights $a'$ are provided with laterally-extending ends $a^2$, which are provided with sockets $a^3$. These sockets may, if desired, be formed in detachable castings $a^4$, applied to the ends $a^2$ of the uprights. The sockets are preferably made flaring at the top for the purpose of receiving pins $c'$, which are attached to the platform $c$ either by means of removable castings $c^2$ or otherwise. The platform is also provided with eyes $c^3$, arranged at convenient points, by means of which flexible or other connections $d$ may be removably attached to the platform, so as to support the platform from a scale or other weighing device $e$. The weighing device is preferably mounted upon a frame $f$, as indicated in Fig. 4, but may be mounted in any desired manner and may be made vertically movable for the purpose of lifting the whole device from the truck and transferring it to a higher point.

$a^5$ is a casting or projection upon the front of the front upright $a'$, which is provided with a perforation $a^6$ for the reception of a pin $c^4$, attached to the bottom of the platform $c$, and is provided for the purpose of additionally guiding and securing the platform with respect to the truck.

It will be observed that the platform may be constructed in any desired manner, so as to render it suitable for different uses. It can be made with or without side pins and front pins and with or without side and front boards, either stationary or detached. It can also be made in box or vessel form, of metal or wood, for weighing grain, coal, loose meats, and other similar articles in bulk. It can also have an adjustable basket, made of metal or wood, to fit the platform, either in sections or not, for use in weighing bread, loose paper, and other articles which it is desired to keep in baskets. The truck may also be made with extensible uprights in place of the stationary uprights $a'$ and the platforms fitted with removable or adjustable guides.

The device is intended to be used with beam-scales, as illustrated, or with any other practical style of scale, the invention not being limited to any particular kind of weighing device.

The sockets $a^3$ may be either open-ended or closed, the latter form being shown in the drawings, and the pins $c'$ may, if desired, be hinged to the edges of the platform. It will be observed that in the present case the pins and sockets are shown as tapering to a point. This construction is provided for the purpose of more readily causing the pins and sockets to register when the platform is lowered upon the truck.

It will be obvious that with this device coffee-bags may be placed upon the platform and weighed and immediately taken to the waiting cars without the transference of the bags from the weighing device to the truck. This causes a great saving, which amounts in practice to about five cents per bag in the case of coffee. It will be obvious also that similar saving may be made with other materials, including those mentioned above.

The vessel or box platform may be used with any ordinary dump-bottom of any make.

While I have described in particular one embodiment of my invention, it will be obvious that many modifications may be made therein without departing from the spirit of the invention and that the latter is not limited to the particular form illustrated in the drawings and described in the specification.

Having thus described my invention, I claim as new and desire to secure by Letters Patent—

1. The combination of a weighing device, and a truck comprising a frame, front and rear uprights each having two sockets, a platform having four conical projections registering with and adapted to rest removably in said sockets, a projection from the front upright having a socket, a pin projecting from the platform and adapted to rest in said socket, and eyes on the platform for the attachment of the weighing device.

2. The combination of a weighing device and a truck comprising a frame, uprights upon said frame each having sockets, a platform having conical projections registering with and adapted to rest removably in said sockets, a projection upon one of said uprights having a socket, a pin projecting from the platform and adapted to rest in said socket, and means on the platform for the attachment of a weighing device.

In testimony whereof I have signed my name to this specification in the presence of two subscribing witnesses.

PAUL MORGAN.

Witnesses:
   JOHN T. SCHOEN,
   ERNEST GRATHER.